(12) United States Patent
Byttebier (10) Patent No.: US 11,589,511 B2
(45) Date of Patent: Feb. 28, 2023

(54) CONTROL SYSTEM AND METHOD FOR CONTROLLING A POSITION OF A HEADER OF AN AGRICULTURAL HARVESTER

(71) Applicant: CNH Industrial America LLC, New Holland, PA (US)

(72) Inventor: Ward M. R. Byttebier, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/612,592

(22) PCT Filed: May 20, 2020

(86) PCT No.: PCT/EP2020/064112
§ 371 (c)(1),
(2) Date: Nov. 19, 2021

(87) PCT Pub. No.: WO2020/234374
PCT Pub. Date: Nov. 26, 2020

(65) Prior Publication Data
US 2022/0232771 A1 Jul. 28, 2022

(30) Foreign Application Priority Data
May 20, 2019 (EP) .................................. 19175417

(51) Int. Cl.
*A01D 41/14* (2006.01)
*A01B 63/02* (2006.01)
(Continued)

(52) U.S. Cl.
CPC ......... *A01D 41/141* (2013.01); *A01D 41/145* (2013.01); *A01B 63/02* (2013.01);
(Continued)

(58) Field of Classification Search
CPC ....... A01B 63/02; A01B 63/10; A01B 63/111; A01D 41/141; A01D 41/127;
(Continued)

(56) References Cited

U.S. PATENT DOCUMENTS 3,851,451 A   12/1974 Agness et al.
3,886,718 A    6/1975 Talbot
(Continued)

FOREIGN PATENT DOCUMENTS

CA     2913937 A1 *  6/2016  ............. A01D 41/14
CN    108012655 A     5/2018
(Continued)

OTHER PUBLICATIONS

International Search Report and Written Opinion for PCT Application No. PCT/EP2020/064112 dated Aug. 20, 2020 (11 pages).
(Continued)

*Primary Examiner* — Arpad F Kovacs
(74) *Attorney, Agent, or Firm* — Peter Zacharias; Patrick Sheldrake (57) ABSTRACT

A control system for controlling pivoting of a header of an agricultural harvester. The control system includes first, second, and third header height sensors, each for mounting to a respective point on the header, each configured to provide a respective header height signal representing a respective measured header height of their respective point on the header above a ground plane. The control system further includes a header angle sensor configured to provide a header angle signal indicative of a pivot angle of the header about an axis; and a processor configured to: receive the signals; calculate an estimated first header height based on the pivot angle and the second and third header heights; determine a replacement first header height by selecting the smallest of the estimated and the measured first header (Continued)

height; and generate a control signal based at least on the replacement first header height.

17 Claims, 6 Drawing Sheets

(51) Int. Cl.
| | |
|---|---|
| A01B 63/10 | (2006.01) |
| A01B 63/111 | (2006.01) |
| A01D 34/00 | (2006.01) |
| A01D 41/127 | (2006.01) |
| A01D 75/28 | (2006.01) |
| G01S 15/10 | (2006.01) |

(52) U.S. Cl.
CPC ............. *A01B 63/10* (2013.01); *A01B 63/111* (2013.01); *A01D 34/006* (2013.01); *A01D 41/127* (2013.01); *A01D 75/287* (2013.01); *G01S 15/101* (2013.01)

(58) Field of Classification Search
CPC .. A01D 34/006; A01D 41/145; A01D 75/287; G01S 15/101
See application file for complete search history.

(56) References Cited

U.S. PATENT DOCUMENTS

| | | | |
|---|---|---|---|
| 4,332,126 A | 6/1982 | Van Auwelaer et al. | |
| 4,612,757 A | 9/1986 | Halls et al. | |
| 4,641,490 A | 2/1987 | Wynn et al. | |
| 4,776,153 A | 10/1988 | DePauw et al. | |
| 4,942,724 A | 7/1990 | Diekhans et al. | |
| 5,155,984 A | 10/1992 | Sheehan | |
| 5,359,836 A * | 11/1994 | Zeuner | A01D 41/141 56/208 |
| 5,577,373 A | 11/1996 | Panoushek et al. | |
| 5,704,200 A * | 1/1998 | Chmielewski, Jr. | A01D 41/141 56/DIG. 15 |
| 6,675,568 B2 * | 1/2004 | Patterson | A01D 57/20 56/228 |
| 8,051,633 B2 * | 11/2011 | Figgins | A01D 41/141 56/181 |
| 9,968,033 B2 * | 5/2018 | Dunn | A01D 41/141 |
| 10,462,968 B2 * | 11/2019 | Shearer | A01D 41/145 |
| 10,568,266 B2 * | 2/2020 | Vandeven | A01D 41/145 |
| 10,820,511 B2 * | 11/2020 | Brimeyer | A01B 63/10 |
| 2007/0068129 A1 * | 3/2007 | Strasser | A01D 41/141 56/10.2 E |
| 2008/0072560 A1 * | 3/2008 | Talbot | A01D 41/14 56/208 |
| 2010/0212276 A1 * | 8/2010 | Digman | A01D 75/287 56/10.2 E |
| 2013/0305674 A1 * | 11/2013 | Patterson | A01D 43/077 56/10.2 A |
| 2015/0013795 A1 * | 1/2015 | Ritter | A01D 41/145 137/596.16 |
| 2015/0033692 A1 * | 2/2015 | Schroeder | A01D 34/008 56/10.2 E |
| 2016/0316624 A1 * | 11/2016 | Ritter | A01D 41/127 |
| 2017/0064904 A1 * | 3/2017 | Figgins | A01D 34/006 |
| 2018/0070531 A1 | 3/2018 | Long et al. | |
| 2018/0279549 A1 * | 10/2018 | Lacy | A01D 41/141 |
| 2018/0368317 A1 * | 12/2018 | Schulze Selting | A01D 41/141 |
| 2019/0059223 A1 * | 2/2019 | Seiders, Jr. | A01D 41/141 |
| 2019/0230857 A1 * | 8/2019 | Thomson | A01D 41/141 |
| 2019/0307070 A1 * | 10/2019 | Dima | A01D 57/04 |
| 2020/0000033 A1 * | 1/2020 | Shearer | A01D 41/141 |
| 2020/0375106 A1 * | 12/2020 | Seiders, Jr. | A01D 41/141 |
| 2021/0185879 A1 * | 6/2021 | Hunt | A01B 63/002 |
| 2021/0185880 A1 * | 6/2021 | Martin | A01D 41/141 |
| 2021/0329837 A1 * | 10/2021 | Schnaider | A01D 41/145 |
| 2021/0332836 A1 * | 10/2021 | Reiners | E02F 9/2217 |

FOREIGN PATENT DOCUMENTS

| | | | | |
|---|---|---|---|---|
| CN | 109379980 A | | 2/2019 | |
| CN | 113840531 A | * | 12/2021 | ........... A01B 73/044 |
| DE | 1119580 B | | 12/1961 | |
| DE | 102010040872 A1 | * | 5/2011 | ........... A01D 41/141 |
| DE | 102020114271 A1 | * | 12/2020 | ........... A01B 63/02 |
| EP | 2832206 A1 | * | 2/2015 | ........... A01D 34/008 |
| EP | 3420798 A1 | | 1/2019 | |
| WO | WO-2020185873 A1 | * | 9/2020 | ........... A01B 63/111 |

OTHER PUBLICATIONS

Extended European Search Report for European Application No. 19175417.5 dated Dec. 12, 2019 (4 pages).

* cited by examiner

CONTROL SYSTEM AND METHOD FOR CONTROLLING A POSITION OF A HEADER OF AN AGRICULTURAL HARVESTER

TECHNICAL FIELD

The present disclosure relates to a control system and method for use with an agricultural harvester, and particularly to a control system and method for controlling positioning of a header of an agricultural harvester.

BACKGROUND

Agricultural harvesters typically have a header unit, or more simply just 'header', by which a crop to be harvested is gathered from a field. Most header types are also operable to cut the standing crop before it is collected by the header. When the harvester is configured to harvest the entire crop including the ears and stalks, the headers are designed to sit close to the ground so that as much of the crop is cut as possible. As the terrain in fields where crops are grown is unlikely to be entirely flat, it is common to mount header height sensors on headers of agricultural harvesters, and to adjust the position of the header, including the height of the header and a transverse angle of the header relative to a main body of the harvester, based on the measurements made by the sensors. Header height sensors measure the distance from the header to a point vertically below on the ground, and so provide an indication of the ground profile or ground plane. In adjusting the height and transverse angle of the header, the effectiveness of the header is improved because more of the crop is cut and the height of the remaining stubble is substantially even, and the header is also prevented from running into the ground. "Ground plane" as used herein refers to the profile of the ground beneath the header, which may be planar, but which may also be curved, e.g., concave or convex.

Typically, two sensors are mounted on an outer right edge and an outer left edge of a frame of the header. The average header height measurement of these sensors is used to control vertical movement of the header, while the difference in the header height measurements is used to alter a pivoting angle of the header. Examples of such a system are provided in U.S. Pat. Nos. 4,942,724 and 4,612,757. Both of these patents describe headers having sensors at their extremes and adjusting the header position based on the output of the sensors.

While the teaching of these patents is useful in harvesters where the sensors are wide and insensitive to ditches and furrows, some harvesters, such as forage harvesters, usually have narrow sensors that are sensitive to furrows and ditches at the edges of a field where the ground is much lower than the ground immediately adjacent to it. As a result, the sensors on a forage harvester will indicate that the header height is much greater at one side than at the other. When a control system of the forage harvester operates to adjust the header height and tilt angle based on sensor readings, the large difference in the two sensed header heights may lead to an incorrect compensation action and a tilt angle and/or header height that is below the level of the field. Consequently, the header will be driven into the ground during the downward movement and will plug with soil, potentially causing damage to the header and to the inside of the harvester.

It is an aim of the present invention to address one or more of the disadvantages associated with the prior art.

SUMMARY OF THE INVENTION

According to an aspect of the invention there is provided a control system for controlling positioning of a header mounted to a main body of an agricultural harvester, the header being pivotable by an actuator about a central axis of the main body. The control system comprises at least three header height sensors. The at least three header height sensors comprise: a first header height sensor mounted at a first point on the header and configured to provide a first header height signal representing a measured first header height of the first point on the header above a ground plane; a second header height sensor mounted at a second point on the header and configured to provide a second header height signal representing a measured second header height of the second point on the header above the ground plane; and a third header height sensor for mounted at an intermediate point on the header between the first point and the second point and configured to provide a third header height signal representing a measured third header height of the intermediate point above the ground plane. The control system comprises a header angle sensor configured to provide a header angle signal indicative of a current pivot angle of the header about the central axis. The control system comprises a processor configured to: receive the signals provided by the header angle sensor and the at least three header height sensors; calculate an estimated first header height based on the current pivot angle and the measured second and third header height; determine a replacement first header height by selecting the smallest of the estimated first header height and the measured first header height; and generate a control signal for positioning the header, comprising controlling the actuator to pivot the header based at least on the replacement first header height.

In essence, therefore, the control system validates the signal received from the first header height sensor to ensure that the measurement made by that sensor is not anomalous when compared to both the measurements from the second and third header height sensors. Validation of the signal ensures that large differences in header height beneath one point of the header due to, for example, a furrow or ditch, are safely identified and dismissed. The result is that the header position can be controlled using the control signal to maintain an adequate distance from the ground and is protected against being too low and/or angled and driven into the ground.

This is particularly useful when opening a field, when the forage harvester has to be driven along the field's edge, which may drop away from the actual height of the field. A narrow sensor, such as those found on forage harvesters, may not be able to identify the furrow as a furrow, and so it is highly beneficial to perform the comparison and validation against other values to reduce the possibility of over-tilting and/or over-lowering the header.

The control system increases the effectiveness of a header when the control signal is used to control the actuator. This is because the header, when controlled according to the control signal, will be closer to parallel relative to the main plane of the field, and can be positioned closer to the ground without danger of plugging with soil.

The first, second, and third header height sensors are considered to be mounted on the header at their respective points. It will be appreciated that the sensors may be mounted elsewhere, and may measure a different height which is used to calculate a relative height of the point on the header relative to the ground. The term "header height" is intended to mean the distance from a particular point on the header to another point on the ground plane that is vertically beneath the point on the header.

The processor may be configured to calculate the estimated first header height by: calculating a first preliminary estimated first header height by extrapolating from the current pivot angle and the second header height; calculating a second preliminary estimated first header height by extrapolating from the current pivot angle and the third header height; and determining the estimated first header height by selecting the largest of the first and second preliminary estimated first header heights.

Extrapolating may further involve use of the angle of an estimated main header plane.

Extrapolating two potential estimated first header heights as the first and second preliminary estimated first header heights allows each of the second and third header heights to be taken into account independently of one another. Considering the heights independently provides an insight into how the ground plane lies and whether it is level, whether it is angled relative to the header and how it is angled, or whether it is concave or convex in relation to the header. From this insight, choosing the largest preliminary estimated header height provides an estimated header height that is part of a useful approximation for a ground plane that is substantially parallel to the header. The comparison between the estimated header height and the measured header height and the choice of the smallest of these therefore provides reasonable limits on the header height so that the tilting or angling of the header is accurate and safe.

The processor may be configured to generate the control signal by determining a new pivot angle of the header about the central axis based on the replacement first header height and the current pivot angle.

The processor may be configured to calculate an estimated second header height based on the current pivot angle and the measured first and third header height; and determine a replacement second header height by selecting the smallest of the estimated second header height and the measured second header height, and wherein the processor is configured to generate the control signal for controlling the actuator to pivot the header based at least on the replacement first header height and/or the replacement second header height.

By determining both a replacement first header height and a replacement second header height and using these to base the control signal on, the control signal is more robust. It is also ensured that any anomalous header heights caused by ditches or furrows beneath the header at either of two points are taken into account automatically, without the side having to be specified. Where no furrows or ditches are identified, the control system still operates to optimise the distance between the header and the ground plane.

The processor may be configured to calculate the estimated second header height by: calculating a first preliminary estimated second header height by extrapolating from the current pivot angle and the first header height; calculating a second preliminary estimated second header height by extrapolating from the current pivot angle and the third header height; and determining the estimated second header height by selecting the largest of the two preliminary estimated first header heights.

Using preliminary estimated header heights for the estimated second header height has the advantages discussed above in relation to the use of preliminary estimated header heights for the estimated first header height.

The processor may be configured to generate the control signal by determining a new pivot angle of the header about the central axis based on the replacement first header height, the replacement second header height, and the current pivot angle.

The processor may be configured to operate in at least two user-selectable modes, wherein: in a first mode of the at least two user-selectable modes the control signal for controlling the actuator to pivot the header is generated based on the replacement first header height, and the measured second and third header heights; and in a second mode of the at least two user-selectable modes the control signal for controlling the actuator to pivot the header is generated based on the replacement second header height and the measured first and third header heights.

The processor may be configured to operate in a third mode in which the control signal for controlling the actuator to pivot the header is generated based on the replacement first header height, the replacement second header height, and the measured third header height.

The user-selectable modes are useful for when the user knows where a ditch or furrow is in relation to the harvester. The user can indicate where the furrow or ditch is in relation to the harvester, and the correct mode can be used to ensure that the replacement header height that is used in generating the control signal is the replacement header height on the side that the furrow or ditch is.

In an embodiment, the first point on the header is on one side of the central axis and the second point on the header is on the other side of the central axis. The intermediate point on the header may be central on the header.

The control system may comprise one or more additional header height sensors, each mounted at a respective further intermediate point on the header between the first and second points, and configured to provide a respective header height signal representing a measured header height of the further intermediate point on the header above a ground plane. For example, a fourth header height sensor may be mounted between the third header height sensor and the first header height sensor.

The processor may be configured to output the control signal to the actuator.

According to another aspect of the invention, there is provided an agricultural harvester comprising a main body, a header mounted to the main body, an actuator configured to pivot the header about a central axis of the harvester parallel to the harvester's forward direction of travel, and the control system described above, wherein the actuator is configured to receive the control signal from the processor of the control system and to pivot the header according to the control signal. The agricultural harvester may be a forage harvester.

The incorporation of the control system into a forage harvester is particularly useful because forage harvesters typically have narrow header height sensors that are not as wide as a furrow or ditch and so are susceptible to measuring including the height of the furrow or ditch in the measurement of the actual header height. By incorporating the control system described above, the forage harvester's header is protected from anomalous sensor measurements.

According to another aspect of the invention, there is provided a method for controlling pivoting of a header mounted to a main body of an agricultural harvester, the header being pivotable by an actuator about a central axis of the harvester parallel to the harvester's forward direction of travel. The method comprises: receiving: a first header height signal representing a measured first header height of a first point on the header above a ground plane; a second header height signal representing a measured second header height of a second point on the header above a ground plane; a third header height signal representing a measured third header height of an intermediate point on the header above a ground plane, the intermediate point on the header being between the first point and the second point; and a header angle signal indicative of an angle of rotation of the header about the central axis; calculating an estimated first header height based on the header angle signal and the second and third header height signals; determining a replacement first header height by selecting the smallest of the estimated first header height and the measured first header height; and generating a control signal for controlling the actuator to pivot the header based at least on the replacement first header height.

The method shares many of the advantages of the control system.

The method may comprise: calculating an estimated second header height based on the header angle signal and the first and third header height signals; and determining a replacement second header height by selecting the smallest of the estimated second header height and the measured second header height, and wherein: generating the control signal for controlling the actuator to pivot the header comprises generating a control signal for controlling the actuator to pivot the header based at least on the replacement first header height and the replacement second header height.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
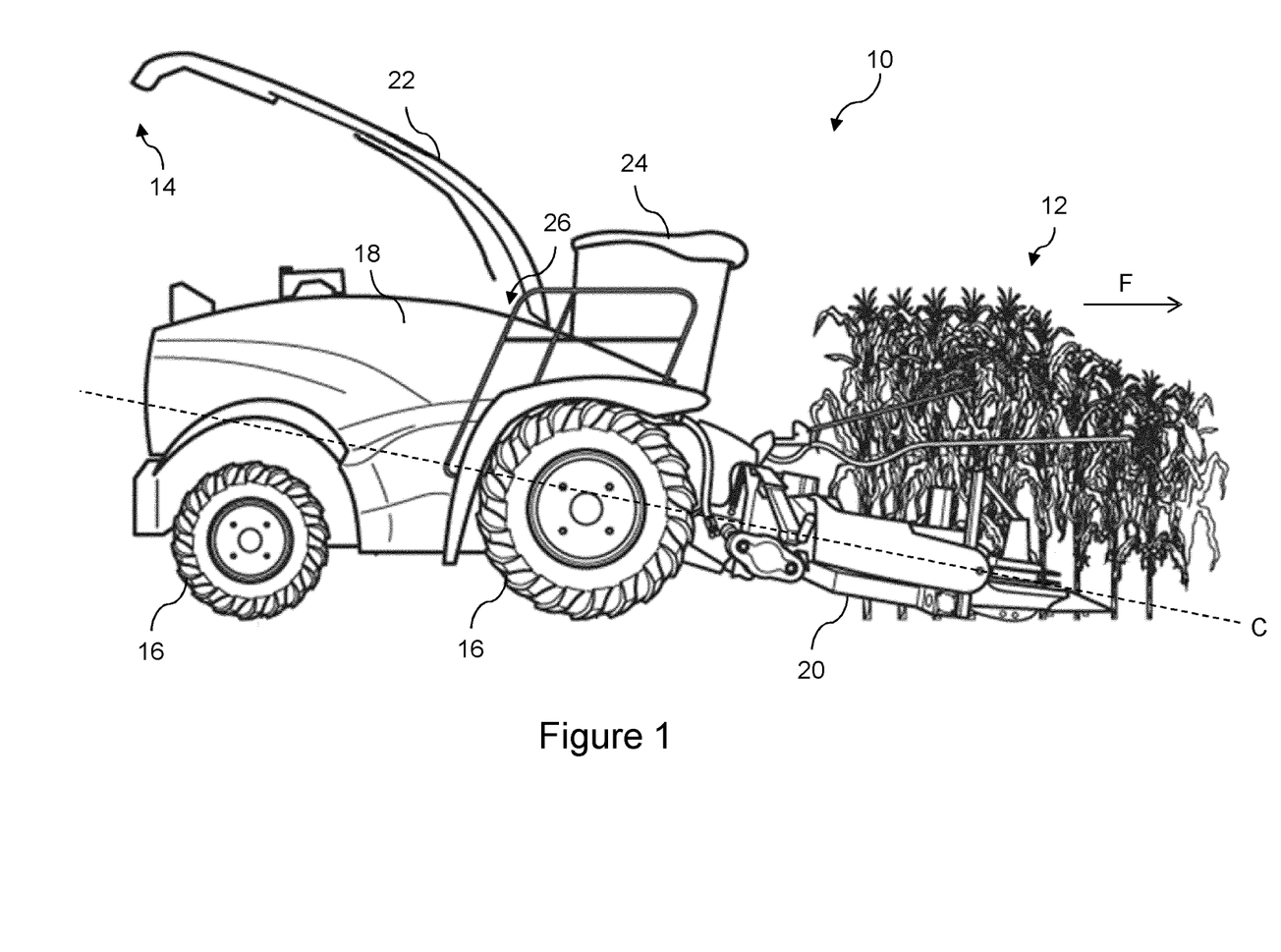
FIG. 1 shows a side view of an agricultural harvester.

FIG. 1 shows a type of agricultural harvester known as a forage harvester 10. The forage harvester 10 harvests a crop 12, chops it into small pieces and blows the chopped crop along a flow path from a blower to an outlet 14 towards a receiving vehicle (not shown).

As can be seen in the side view of FIG. 1, the forage harvester 10 has wheels 16, a chassis 18, a header 20, a spout 22, and an operator cab 24. The wheels 16 carry the chassis 18, which in turn supports a front portion, which is pivotable about a transverse axis and to which the header 20 is attached. The header 20 is selected to harvest, i.e. cut and collect, the crop from the field as the forage harvester 10 goes in a fore direction, F. The harvested crop is processed and is chopped into small pieces, e.g., for storage in a silo and eventually for feeding to animals, by a cutting device installed in the pivotable front portion. The chopped crop is transferred through the harvester 10 and is propelled along and out of the spout 22.

The harvester 10 is operated and configured to harvest as much of the crop as possible so the greatest yield can be achieved. To harvest as much of the crop as possible, the crop has to be cut as low to the ground as possible. The header 20 therefore has to be positioned as close to the ground as possible in order to cut the stalks of the crop at a low position.

Ideally, the ground would be a flat surface with no variation. However, in practice this is not the case, and the ground is uneven and varies. For example, the ground may be slanted, convex, concave, and/or incorporate features such as furrows or ditches. To account for these variations, the header 20 is both movable and pivotable relative to the main body 18 by virtue of one or more actuators (not shown in FIG. 1).

Figure 2:
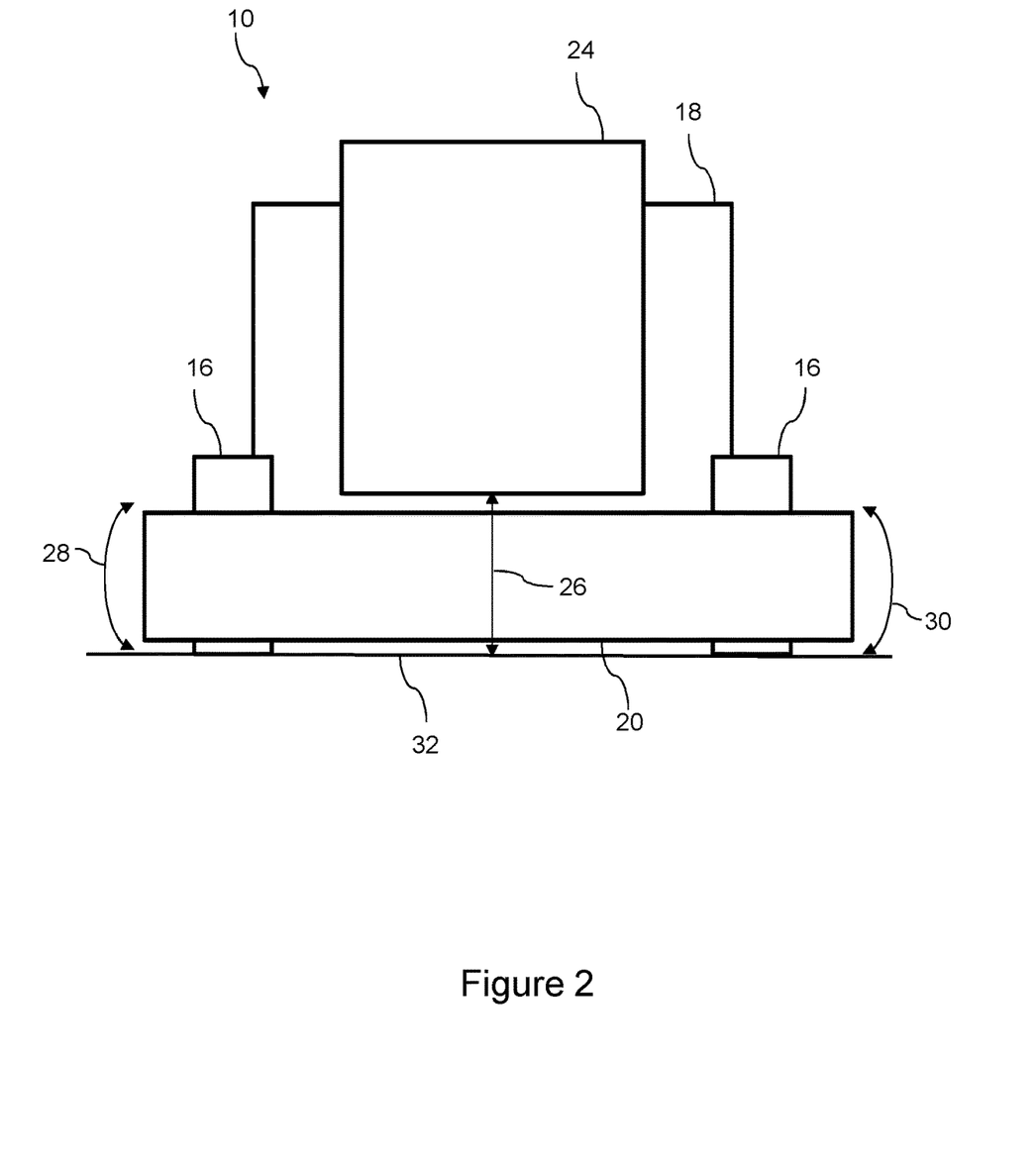
FIG. 2 shows a block representation of the agricultural harvester when viewed from the front.

FIG. 2 is a simplified diagram of the forage harvester 10 when viewed from the front and is provided to illustrate how the header 20 is movable and pivotable. In FIG. 2, the main body 18, operator cab 24, wheels 16, and header 20 are shown. The harvester 10 is depicted on a ground plane 32. Arrow 26 illustrates how header 20 is vertically movable relative to the main body 18 of the harvester 10. This may be realized by an actuator pivoting the front portion of the forage harvester 10 about a transverse axis. Arrows 28 and 30 illustrate how the header 20 is pivotable relative to the main body 18. The header 20 is pivotable about a central axis of the harvester 10. The central axis may be an axis extending parallel to a main direction of travel F of the harvester 10 or an axis in the plane of but angled relative to the main direction of travel of the harvester 10, such as axis C in FIG. 1. The header 20 may also be pivotable about other axes that are normal to or otherwise arranged relative to the central axis, although these additional axes of pivoting are not considered here. The one or more actuators that are used for pivoting and moving the header 20 are not visible in FIGS. 1 and 2.

Figure 3:
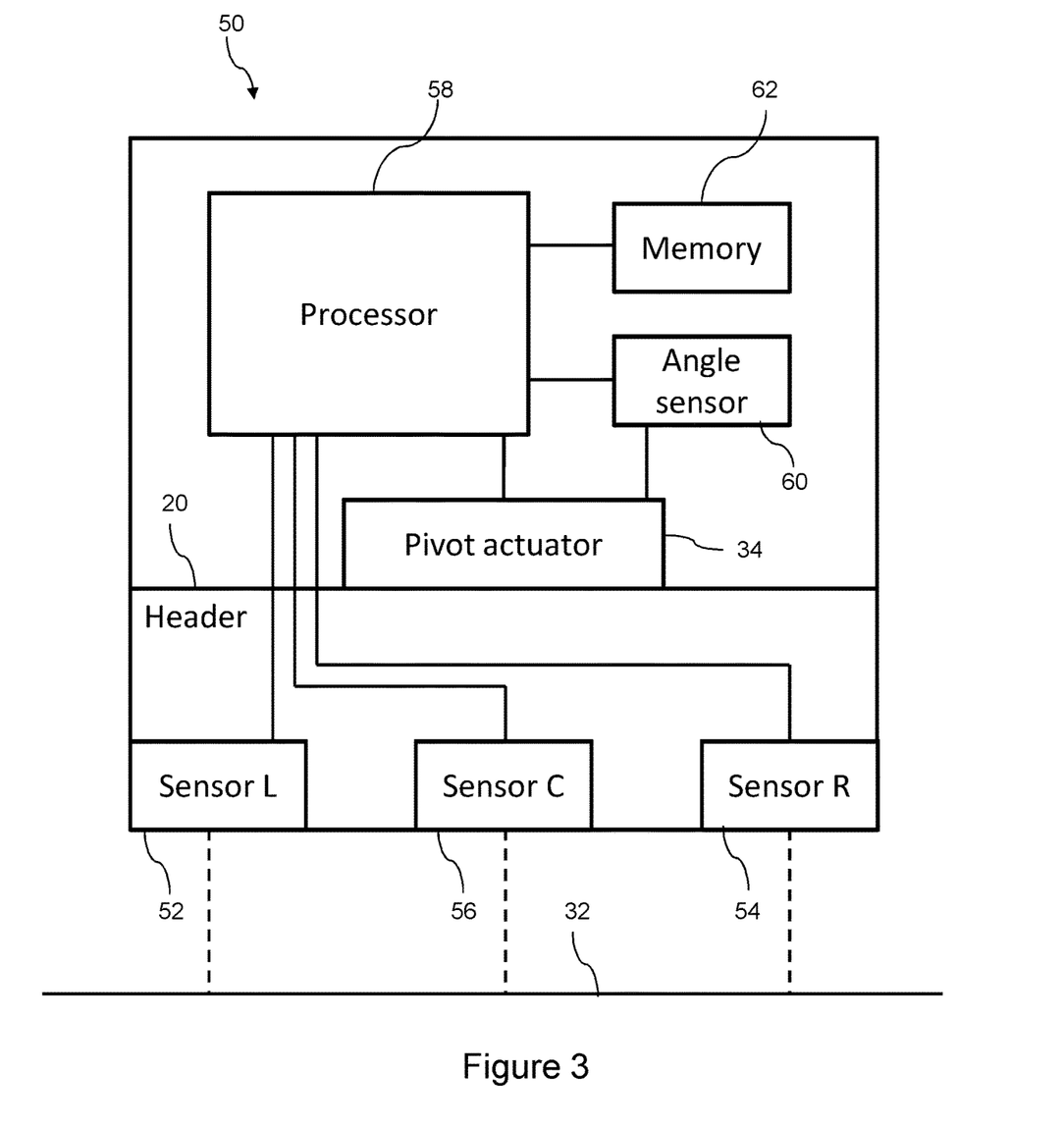
FIG. 3 shows a schematic diagram of a control system of the agricultural harvester.

FIG. 3 shows a control system 50 for controlling the pivoting of the header 20. Also shown in FIG. 3 are the header 20, an actuator 34 for pivoting the header 20 labelled 'pivot actuator', and the ground plane 32 beneath the header 20. The control system 50 includes three header height sensors: a first, left-hand header height sensor 52, labelled 'sensor L', a second, right-hand header height sensor 54, labelled 'sensor R', and a third, central header height sensor 56, labelled 'sensor C'. The header height sensors 52, 54, 56 are each connected to a processor 58. The control system 50 further comprises a header angle sensor 60 and memory storage 62.

Elements of the control system 50 are illustrated in FIG. 3 as being connected together by connection lines. The connection lines may be any suitable connection configured for one-way or two-way communication between the connected elements as required. In some systems, the connection may be wireless.

The header height sensors 52, 54, 56 may be any sensor suitable for measuring a distance vertically below it. For example, the sensors may sense distance using ultrasound or lasers, or may be physical sensors that measure distance based on the position of a part that touches the ground. The header angle sensor 60 may be any sensor suitable for measuring a rotational angle, such as, for example, a rotary encoder.

The three header height sensors 52, 54, 56 are mounted at respective positions on the header 20. The left-hand header height sensor 52 is mounted at a first point on the left-hand side of the header 20. The right-hand header height sensor 54 is mounted at a second point on the right-hand side of the header 20. The central header height sensor 56 is mounted at a third point in the centre of the header 20, and so is between the left- and right-hand sides and header height sensors 52, 54. In some embodiments, the central header height sensor 56 may be mounted closer to the front end or rear end of the header than the left and right header height sensors 52, 54. Each header height sensor 52, 54, 56 is configured to provide a respective header height signal representing a measured header height of the point on the header 20 to which the header height sensor 52, 54, 56 is mounted above the ground plane 32. Therefore, a left-hand, right-hand, and central header height signal are provided from the three header height sensors 52, 54, 56, representing a measured right-hand header height, a measured left-hand header height, and a measured central header height. The measured heights will be discussed in more detail below in relation to FIG. 6.

As described above, the control system 50 includes the header angle sensor 60, which is configured to provide a header angle signal indicative of a current pivot angle of the header 20 about the central axis about which the header 20 is pivotable. The current pivot angle will be discussed in more detail in relation to FIG. 6.

Each of the header angle signal and the header height signals are provided to the processor 58 by their respective sensors 60, 52, 54, 56 via the connections between the sensors 60, 52, 54, 56 and the processor 58. The processor 58 is configured to use the received signals to generate a control signal for controlling the actuator 34. The actuator 34 may be controlled according to the control signal, so as to pivot the header 20 so that a new angle is achieved relative to the main body 18 until the angle sensor 60 indicates that the new angle has been achieved, or until the actuator 34 has been moved a specific amount. The processor 58 may store the received signals, measurements, or the newly calculated angle or signal in the memory 62 for later retrieval.

Figure 4:
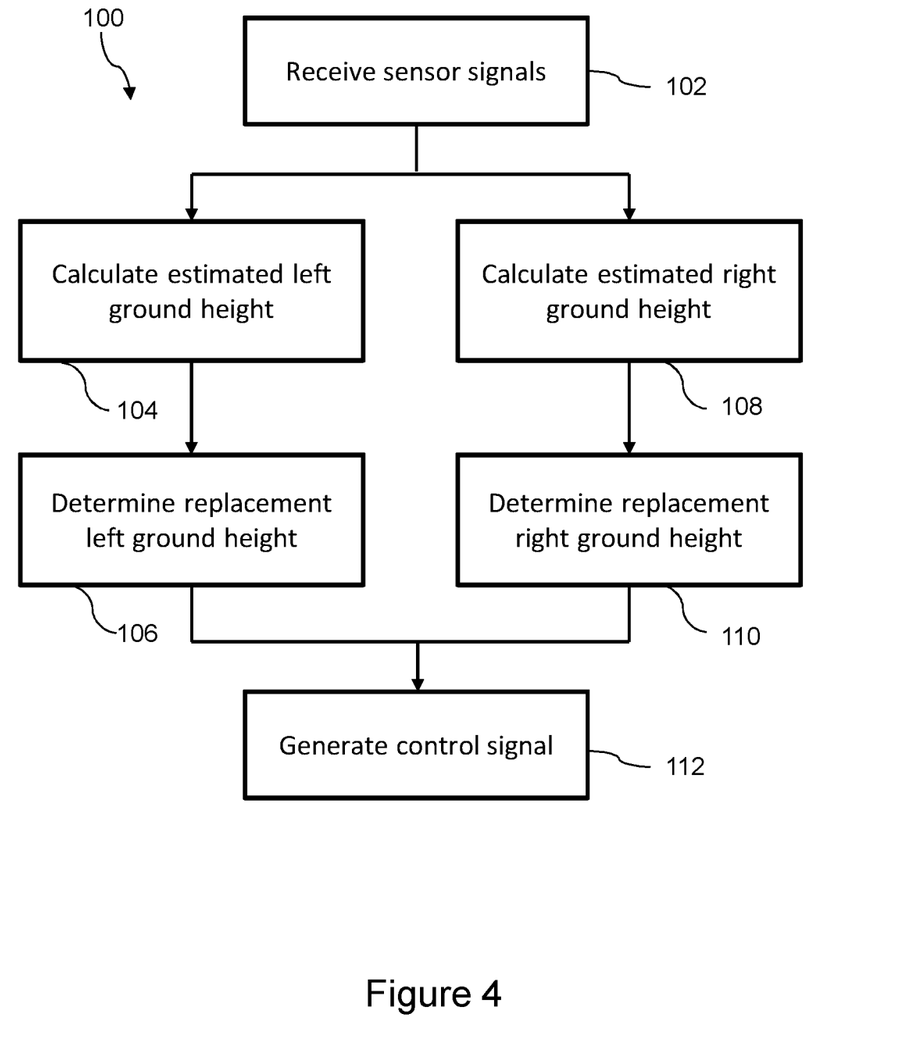
FIG. 4 shows a flow chart governing generalised operation of the control system to pivot a header of the agricultural harvester.

The general operation of the processor 58 is depicted in the flow chart 100 of FIG. 4. As shown in FIG. 4, at a first step 102, the processor 58 receives the header height and header angle signals. These signals are typically provided by the header angle sensor 60 and the three header height sensors 52, 54, 56, although in some embodiments, the header angle signal may be received from memory 62 according to the most recent measurement or according to the most recent header pivot command. Having received the sensor signals at step 102, the flow chart has two separate channels. In one channel, the processor 58 performs the steps 104, 106 of calculating an estimated left header height based on the current header angle and the measured right and central header heights, and determining a replacement left header height by selecting the smallest of the estimated left header height and the measured left header height. In the other channel, a similar process is performed for the right header height; the processor 58 performs the steps 108, 110 of calculating an estimated right header height based on the current header angle and the measured left and central header heights, and determining a replacement right header height by selecting the smallest of the estimated right header height and the measured right header height. In the final step 112 of the flow chart 100 of FIG. 4, the processor 58 generates a control signal for controlling the actuator 34 to pivot the header 20 based at least on the replacement right header height and the replacement left header height. In some embodiments, the control signal may also be based on the measured central header height.

Although both replacement left and replacement right header heights are determined in the embodiment of FIG. 4, in other embodiments only one of the replacement left or replacement right header heights may be determined, and the control signal may be generated based on whichever replacement header height is determined. In these embodiments, the measured central header height and the other of the left or right header heights for which a replacement is not determined may be used to base the control signal upon.

Figure 5:
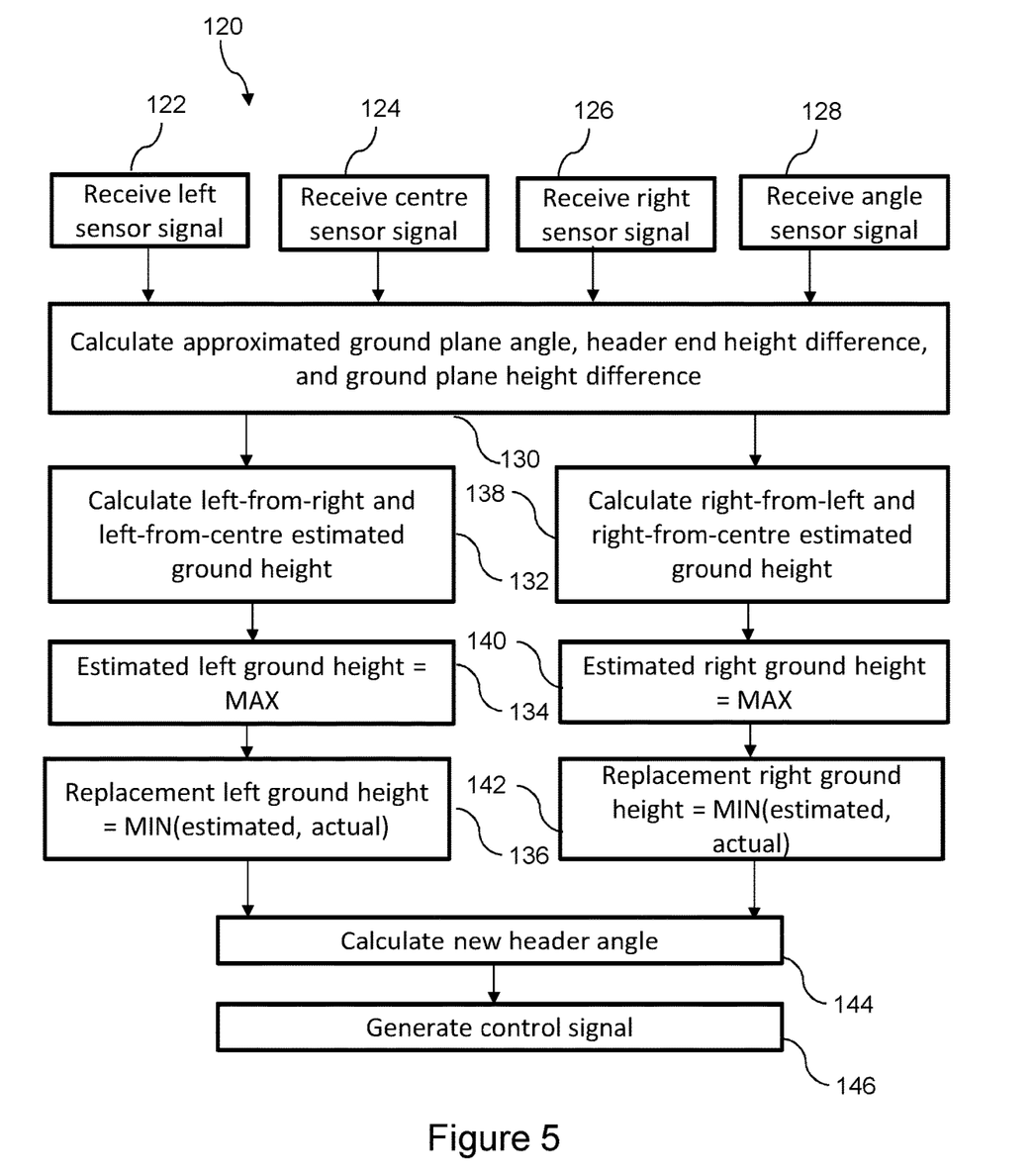
FIG. 5 shows a flow chart governing detailed operation of the control system to pivot the header of the agricultural harvester.
Figure 6:
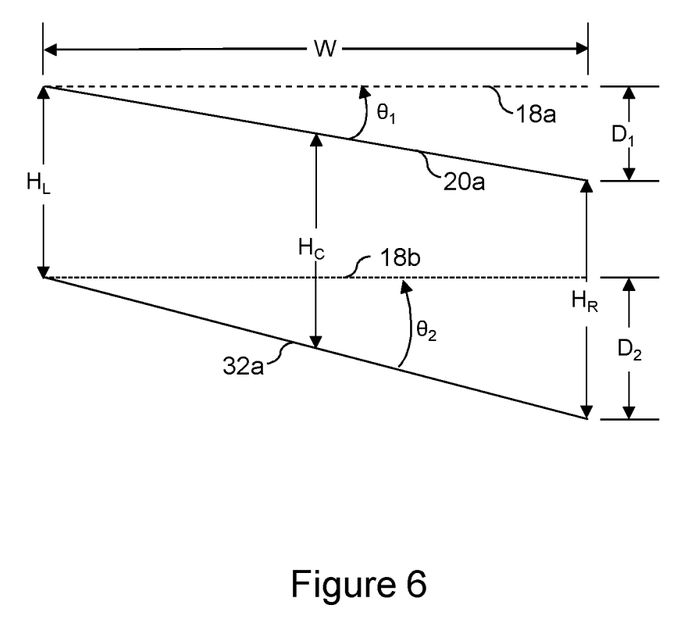
FIG. 6 shows a schematic diagram of the header relative to a ground plane, the measurements made by the sensors, and the parameters determined by the control system.

FIG. 5 provides a flow chart 120 that is shows an embodiment of the flow chart 100 of FIG. 4, while FIG. 6 provides an illustration of the parameters required for the calculations in the flow chart 120 of FIG. 5.

Initially considering FIG. 6, a representation 18a of the main body 18, also of the front wheels 16, is provided as a dashed line, while a representation 20a of the header 20 is provided as a solid line 20a. The representation 18a of the main body 18 is referred to as a reference plane. A projection 18b of the reference plane is provide as a dotted line for contrasting with an approximate ground plane 32a shown as a solid line. The approximate ground plane is the ground plane that is approximated based on the sensor readings from the header height sensors 52, 54, 56 and the header angle sensor 60. Parameters shown in FIG. 6 include width of the header W, header angle $\theta_1$ between the reference plane and the header 20, left header height $H_L$, centre header height $H_C$, and right header height $H_R$, all measured relative to the actual ground plane 32. These parameters are known or measurable by sensors. Also shown in FIG. 6 are a header end height difference $D_1$, a ground plane height difference $D_2$, and an approximated ground plane angle $\theta_2$, which are calculated in subsequent steps of the flow chart 120 as will be described below.

The header end height difference $D_1$ is a value for the difference in height of the ends of the header 20 caused by the header angle $\theta_1$, when measured relative to the main body 18. This value can be calculated based on the header angle $\theta_1$ and the header width W using the following formula:

$$D_1 = \tan(\theta_1) \times W$$

Additionally, in the arrangement of FIG. 6, the calculation of $D_1$, and the equations provided below, positive angles are used where the header 20 is pivoted clockwise and negative angles are used where the header 20 is pivoted anti-clockwise as viewed from the front, so that when a right point is lower than a left point, the sign is positive and when a left point is lower than a right point, the sign is negative. When the header 20 is horizontal relative to the main body 18 of the harvester 10, the header angle is zero.

The approximated ground plane angle $\theta_2$ is an angle of the approximate ground plane 32a relative to the projection 18b of the reference plane based on the height sensor measurements and the calculated header end height difference $D_1$. The approximated ground plane angle $\theta_2$ is calculated by determining three preliminary angles. Each of the three preliminary angles is an angle formed by the measurements from two of the three height sensors, when taking calculated header end height difference $D_1$ into account. A first angle is calculated based on the difference between the calculated heights from the reference plane 18a to the actual ground plane 32 at the left and right of the header, a second angle is calculated based on difference between calculated heights from the reference plane 18a to the actual ground plane 32 at the left and centre of the header, and a third angle is calculated based on the difference between calculated heights from the reference plane 18a to the actual ground plane 32 at the centre and right of the header. So, for example, where the header is angled and the right end of the header is lower than the left end as shown in FIG. 6, the first preliminary angle will be the angle formed by the difference between the measured left header height $H_L$ and the combined value for the measured right header height $H_R$ and $D_1$. The second preliminary angle is the angle formed by the difference between $H_L$ and the combined value of $H_C$ and ½ $D_1$. The third preliminary angle is the angle formed by the difference between the combined value of $H_C$ and ½ $D_1$ and the combined value of $H_R$ and $D_1$.

Having calculated each of the three preliminary angles, if the sign of the second and third angles differ, then the actual ground plane is either substantially concave or convex, and so the approximate ground plane 32a is considered to be flat to account for this. Otherwise, the minimum angle of the three calculated angles is taken as the actual approximated ground plane angle $\theta_2$.

The ground plane height difference $D_2$ is a value for the difference in height of the approximated ground plane 32a at the two header ends. This value can be calculated based on the approximated ground plane angle $\theta_2$ and the header width W using the following formula:

$$D_2 = \tan(\theta_2) \times W$$

Returning to FIG. 5, the signals are received from each of the left, right, and, centre header height sensors 52, 54, 56 and the header angle sensor 60 at steps 122, 124, 126, and 128. These steps 122, 124, 126, 128 correspond to step 102 in FIG. 4. The signals are representative of the header angle $\theta_1$, the left header height $H_L$, the centre header height $H_C$, and the right header height $H_R$.

The additional parameters, header end height difference $D_1$, ground plane height difference $D_2$, and approximated ground plane angle $\theta_2$, are calculated in the next step 130 of the flow chart 120 of FIG. 5.

Having calculated the additional parameters, the steps 132, 134, 138, 140 of FIG. 5 corresponding to steps 104 and 108 are performed to calculate estimated left header height and estimated right header height. In FIG. 5, calculating the estimated left header height and calculating the estimated right header height each comprises the steps 132, 134 (left) and 138, 140 (right) of calculating two preliminary estimated header heights and then choosing the maximum value from these preliminary estimated header heights.

For the estimated left header height, the preliminary estimated header heights are projected values based on the measured right header height, a 'left-from-right estimated header height', and based on the measured centre header height, 'a left-from-centre estimated header height'. For the estimated right header height, the preliminary estimated header heights are projected values based on the measured left header height, 'a right-from-left estimated header height', and based on the centre header height, 'a right-from-centre estimated header height'. The preliminary estimated header heights are extrapolated values that predict a possible header height being estimated, based on the measurement, the header end height difference, and the ground plane height difference.

Where $D_1$ is header end height difference, $D_2$ is ground plane height difference, $H_R$ is the measured right header height, $H_L$ is the measured left header height, and $H_C$ is the measured centre header height, the left-from-right (L-R) estimated header height can be calculated by formula (1), the left-from-centre (L-C) estimated header height can be calculated by formula (2), the right-from-left (R-L) estimated header height can be calculated by formula (3), and the right-from-centre (R-C) estimated header height can be calculated by formula (4):

$$L\text{-}R = H_R + D_1 - D_2 \tag{1}$$

$$L\text{-}C = H_C + \tfrac{1}{2}D_1 - \tfrac{1}{2}D_2 \tag{2}$$

$$R\text{-}L = H_L - D_1 + D_2 \tag{3}$$

$$R\text{-}C = H_C - \tfrac{1}{2}D_1 + \tfrac{1}{2}D_2 \tag{4}$$

Having calculated the two preliminary header heights for each side, the estimated header height is selected by taking the maximum of the two preliminary header heights at step 134 for the left side, and step 140 for the right side. For the estimated left header height, the maximum of the left-from-right preliminary estimated header height and the left-from-centre preliminary estimated header height is calculated. For the estimated right header height, the maximum of the right-from-left preliminary estimated header height and the right-from-centre preliminary estimated header height is calculated.

The estimated header heights are then compared with measured header heights, and the minimum of the estimated and measured, also referred to as actual header height, is found for each side at steps 136 and 142 respectively. This minimum of the estimated and measured header height is referred to as the replacement header height, corresponding to steps 106 and 110 of FIG. 4.

The replacement header heights are together used to calculate a new angle for angling the header at step 144. This calculation may comprise finding the difference between the two replacement header heights and calculating an angle based on the difference.

In the last step 146 of the method 120 of FIG. 5, as in FIG. 4, a control signal is generated. The control signal may then be sent to the actuator 34 and the actuator 34 operated according to the control signal, thereby altering the angle of the header 20.

As with FIG. 4, in some embodiments the process 100 may also be performed for one side only, so that only the left-hand strand or the right-hand strand is performed. In these embodiments, the new header angle may be calculated by comparing the replacement header height that is determined with the measured header height from the other side. In these embodiments, the user may select a mode where it is specified which side the calculations should be performed on. For example, if the user knows that there is a ditch on the left-hand side of the harvester 10 because they are opening a field, the user would set the control system so that the processor operates in a left-hand mode in which the a replacement left-hand header height is calculated and the control signal is generated based on the replacement left-hand header height, and the measured right-hand and centre header heights. There would therefore be at least two modes in which only one of the two replacement header heights is used to generate the control signal. There may also be the normal mode described above in which both replacement header heights are used to generate the control signal.

In addition to controlling the pivot angle of the header 20, the control system 50 may also be configured to generate control signals for an actuator 34 connected to the header 20 to control its vertical height.

It will be appreciated that various changes and modifications can be made to the present invention without departing from the scope of the present application.

The invention claimed is:

1. A control system for controlling positioning of a header mounted to a main body of an agricultural harvester, the header being pivotable by an actuator about a central axis of the main body, the control system comprising:
   at least three header height sensors comprising:
      a first header height sensor for mounting at a first point on the header, and configured to provide a first header height signal representing a measured first header height of the first point on the header above a ground plane;
      a second header height sensor for mounting at a second point on the header, and configured to provide a second header height signal representing a measured second header height of the second point on the header above the ground plane; and
      a third header height sensor for mounting at an intermediate point on the header between the first point and the second point, and configured to provide a third header height signal representing a measured third header height of the intermediate point above the ground plane;
   a header angle sensor configured to provide a header angle signal indicative of a current pivot angle of the header about the central axis; and
   a processor configured to:
      receive the signals provided by the header angle sensor and the at least three header height sensors;
      calculate an estimated first header height based on the current pivot angle and the measured second and third header heights;
      determine a replacement first header height by selecting a smallest of the estimated first header height and the measured first header height; and
      generate a control signal for positioning the header, comprising controlling the actuator to pivot the header based at least on the replacement first header height.

2. The control system of claim 1, wherein the processor is configured to calculate the estimated first header height by:
   calculating a first preliminary estimated first header height by extrapolating from the measured second header height using the current pivot angle;
   calculating a second preliminary estimated first header height by extrapolating from the measured third header height using the current pivot angle; and
   determining the estimated first header height by selecting a largest of the first and second preliminary estimated first header heights.

3. The control system of claim 2,
   wherein the processor is further configured to:
      determine an approximated ground plane angle from the measured first, second, and third header heights and the current pivot angle; and
   wherein the processor is configured to:
      calculate the first preliminary estimated first header height by extrapolating from the measured second header height using the current pivot angle and an approximated ground plane angle; and
      calculate the second preliminary estimated first header height by extrapolating from the measured third header height using the current pivot angle; and the approximated ground plane angle.

4. The control system of claim 3, wherein the processor is further configured to:
   calculate three preliminary angles from height differences between the measured first and second header heights, between the measured first and third header heights, and between the measured second and third header heights, respectively, and the current pivot angle;
   determine that the approximated ground plane angle is zero when a sign of the second and third preliminary angles is different; and
   determine that the approximated ground plane angle is equal to the minimum angle of the three preliminary angles when the sign of the second and third preliminary angles is the same.

5. The control system of claim 1, wherein the processor is configured to generate the control signal by:
   determining a new pivot angle of the header about the central axis based on the replacement first header height and the current pivot angle.

6. The control system of claim 1, wherein the processor is further configured to:
   calculate an estimated second header height based on the current pivot angle and the measured first and third header heights; and
   determine a replacement second header height by selecting a smallest of the estimated second header height and the measured second header height, and wherein:
      the processor is configured to generate the control signal for controlling the actuator to pivot the header based at least on the replacement first header height or the replacement second header height.

7. The control system of claim 6, wherein the processor is configured to calculate the estimated second header height by:
   calculating a first preliminary estimated second header height by extrapolating from the measured first header height using the current pivot angle;
   calculating a second preliminary estimated second header height by extrapolating from the measured third header height using the current pivot angle; and
   determining the estimated second header height by selecting a largest of the first and second preliminary estimated second header heights.

8. The control system of claim 7, wherein the processor is configured to:
   calculate the first preliminary estimated second header height by extrapolating from the measured first header height using the current pivot angle and an approximated ground plane angle;
   calculate the second preliminary estimated second header height by extrapolating from the measured third header height using the current pivot angle; and the approximated ground plane angle.

9. The control system of claim 6, wherein the processor is configured to generate the control signal by:
   determining a new pivot angle of the header about the central axis based on the replacement first header height, the replacement second header height, and the current pivot angle.

10. The control system of claim 6, wherein the processor is configured to operate in at least two user-selectable modes, wherein:
    in a first mode of the at least two user-selectable modes the control signal for controlling the actuator to pivot the header is generated based on the replacement first header height, and the measured second and third header heights; and
    in a second mode of the at least two user-selectable modes the control signal for controlling the actuator to pivot the header is generated based on the replacement second header height, and the measured first and third header heights.

11. The control system of claim 1, wherein the first point on the header is on one side of the central axis and wherein the second point on the header is on another side of the central axis.

12. The control system of claim 11, wherein the intermediate point on the header is central on the header.

13. The control system of claim 1, wherein the processor is further configured to output the control signal to the actuator.

14. An agricultural harvester comprising a main body, a header mounted to the main body, an actuator configured to pivot the header about a central axis of the harvester parallel to a forward direction of travel, and the control system of claim 1, wherein the actuator is configured to receive the control signal from the processor of the control system and to pivot the header according to the control signal.

15. The agricultural harvester of claim 11, wherein the agricultural harvester is a forage harvester.

16. A method for controlling pivoting of a header mounted to a main body of an agricultural harvester, the header being pivotable by an actuator about a central axis of the harvester parallel to the harvester's forward direction of travel, the method comprising:
    receiving:
        a first header height signal representing a measured first header height of a first point on the header above a ground plane;
        a second header height signal representing a measured second header height of a second point on the header above a ground plane;
        a third header height signal representing a measured third header height of an intermediate point on the header above a ground plane, the intermediate point on the header being between the first point and the second point; and
        a header angle signal indicative of an angle of rotation of the header about the central axis;
    calculating an estimated first header height based on the header angle signal and the second and third header height signals;
    determining a replacement first header height by selecting a smallest of the estimated first header height and the measured first header height; and
    generating a control signal for controlling the actuator to pivot the header based at least on the replacement first header height.

17. The method of claim 16, further comprising:
    calculating an estimated second header height based on the header angle signal and the first and third header height signals; and
    determining a replacement second header height by selecting a smallest of the estimated second header height and the measured second header height, and wherein:
    generating the control signal for controlling the actuator to pivot the header comprises generating a control signal for controlling the actuator to pivot the header based at least on the replacement first header height and the replacement second header height.

* * * * *